US011900484B2

(12) United States Patent
Srinivasan et al.

(10) Patent No.: US 11,900,484 B2
(45) Date of Patent: *Feb. 13, 2024

(54) SYSTEM AND METHOD OF SHARING CONTENT CONSUMPTION INFORMATION

(71) Applicant: Comcast Cable Communications, LLC, Philadelphia, PA (US)

(72) Inventors: Thirunarayanan Srinivasan, Highlands Ranch, CO (US); Andrew Lagrossa, Downingtown, PA (US); Corey Farrell, Lansdowne, VA (US); Mehul Patel, Downingtown, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/992,485

(22) Filed: Nov. 22, 2022

(65) Prior Publication Data

US 2023/0162294 A1    May 25, 2023

Related U.S. Application Data

(63) Continuation of application No. 16/931,572, filed on Jul. 17, 2020, now Pat. No. 11,538,119, which is a continuation of application No. 13/552,780, filed on Jul. 19, 2012, now Pat. No. 10,762,582.

(51) Int. Cl.
*G06Q 50/00*    (2012.01)
*H04L 9/32*    (2006.01)

(52) U.S. Cl.
CPC ............ *G06Q 50/01* (2013.01); *H04L 9/3231* (2013.01)

(58) Field of Classification Search
CPC .............................. G06Q 50/01; H04L 9/3231
See application file for complete search history.

(56) References Cited

U.S. PATENT DOCUMENTS

| | | | | |
|---|---|---|---|---|
| 7,296,284 B1* | 11/2007 | Price | ................. | H04N 21/4668 725/24 |
| 7,650,057 B2* | 1/2010 | Takeshita | ........... | H04N 21/4147 386/326 |
| 7,904,581 B2* | 3/2011 | Sherer | ............... | H04N 21/26616 725/86 |
| 8,938,768 B2* | 1/2015 | Kim | .................... | H04N 21/4788 725/51 |
| 8,955,001 B2* | 2/2015 | Bhatia | ................ | H04N 21/2668 725/12 |
| 9,202,105 B1* | 12/2015 | Wang | ................ | H04N 21/44008 |
| 9,967,618 B2* | 5/2018 | Blong | .............. | H04N 21/42203 |
| 2001/0028463 A1* | 10/2001 | Iwamura | ............ | H04N 21/4405 375/E7.009 |

(Continued)

OTHER PUBLICATIONS

Kinect Adventures! http://en.wikipedia.org/wiki/Kinect_Adventures! visited website Mar. 25, 2015.

*Primary Examiner* — Nathan J Flynn
*Assistant Examiner* — Christine A Kurien
(74) *Attorney, Agent, or Firm* — Banner & Witcoff, Ltd.

(57) ABSTRACT

The disclosure relates to identifying a user consuming content so that the user can share information on a social network communication service. Aspects of the disclosure relate to detecting reactions to the content and transmitting information to a social networking service associated with the user.

34 Claims, 8 Drawing Sheets

(56) References Cited

U.S. PATENT DOCUMENTS

| | | | | |
|---|---|---|---|---|
| 2002/0174425 A1* | 11/2002 | Markel | | G06Q 30/02 348/E7.071 |
| 2005/0010637 A1* | 1/2005 | Dempski | | G06F 16/4393 348/E7.083 |
| 2005/0289582 A1* | 12/2005 | Tavares | | H04N 21/25891 725/10 |
| 2006/0271997 A1* | 11/2006 | Jacoby | | H04N 21/4781 348/E7.071 |
| 2007/0188665 A1* | 8/2007 | Watson | | H04N 21/4384 348/731 |
| 2008/0080420 A1* | 4/2008 | Iyer | | H04W 8/005 370/329 |
| 2008/0141307 A1* | 6/2008 | Whitehead | | H04N 21/84 725/46 |
| 2008/0148366 A1* | 6/2008 | Wahl | | G06F 21/36 726/4 |
| 2009/0041284 A1 | 2/2009 | Tanaka et al. | | |
| 2009/0133051 A1* | 5/2009 | Hildreth | | H04N 21/42204 725/28 |
| 2009/0144780 A1* | 6/2009 | Toebes | | G06Q 10/00 725/87 |
| 2009/0241160 A1* | 9/2009 | Campagna | | H04N 7/17318 725/131 |
| 2009/0293079 A1* | 11/2009 | McKee | | H04N 21/4788 725/10 |
| 2010/0238303 A1* | 9/2010 | Newell | | H04N 21/4334 725/136 |
| 2010/0257112 A1* | 10/2010 | Barrett | | G06Q 50/01 705/319 |
| 2011/0088055 A1* | 4/2011 | Kreth | | H04N 21/6125 725/109 |
| 2011/0162008 A1* | 6/2011 | Aldrey | | H04N 21/4722 725/40 |
| 2011/0225515 A1* | 9/2011 | Goldman | | G06Q 50/01 715/753 |
| 2012/0066704 A1* | 3/2012 | Agevik | | G06F 16/436 725/10 |
| 2012/0072939 A1* | 3/2012 | Crenshaw | | H04N 21/44218 725/12 |
| 2012/0185887 A1* | 7/2012 | Newell | | H04N 5/77 725/12 |
| 2012/0254911 A1 | 10/2012 | Doe | | |
| 2012/0324491 A1* | 12/2012 | Bathiche | | H04N 21/42201 725/10 |
| 2013/0041976 A1* | 2/2013 | Hendricks | | G06Q 30/02 709/217 |
| 2013/0117375 A1* | 5/2013 | Bist | | G06Q 50/01 709/205 |
| 2013/0251172 A1 | 9/2013 | Mosseri | | |
| 2013/0290994 A1 | 10/2013 | Machado et al. | | |
| 2013/0339433 A1* | 12/2013 | Li | | H04N 21/4667 709/204 |
| 2014/0075465 A1* | 3/2014 | Petrovic | | H04N 21/8456 725/14 |
| 2014/0137144 A1* | 5/2014 | Jarvenpaa | | H04N 21/6582 725/9 |
| 2015/0110471 A1* | 4/2015 | Zheng | | G06F 3/005 386/291 |

\* cited by examiner

FIG. 4

SYSTEM AND METHOD OF SHARING CONTENT CONSUMPTION INFORMATION

CROSS-REFERENCE TO RELATED APPLICATIONS

This application is a continuation of and claims priority to U.S. patent application Ser. No. 16/931,572, filed Jul. 17, 2020, which is a continuation of U.S. patent application Ser. No. 13/552,780, filed Jul. 19, 2012 (now U.S. Pat. No. 10,762,582), each of which is hereby incorporated by reference in its entirety.

FIELD OF ART

Features described herein relate generally to, among other aspects, sharing content consumption information.

BACKGROUND

As technology develops, more and more devices for sharing interests and opinions have emerged. Social networking services, such as Plaxo, Tunerfish, Facebook, MySpace, Twitter, etc., are one type of communication platform that has allowed interests and opinions to be shared. Social networking services are formed from a network of computers operated by various users. Often, users must opt-in to the social networking services. Typically, users wishing to be a part of a particular social networking service select or are assigned a specific username and password. These usernames and passwords are used by the user to log-in and log-out of their social networking services. Entering usernames and passwords is often tedious, and therefore, can be a deterrent to users logging into their social networking services. Further, it is common for each user to belong to more than one social networking service. For users that belong to multiple social networking services, it may be annoying to log into or maintain connections with each social networking service. In addition, users may not belong to or utilize multiple social networking services because they may not want to remember or maintain additional usernames and passwords. Aspects of this disclosure may provide solutions to the foregoing and other shortcomings.

SUMMARY

Some of the various features described herein may facilitate sharing content consumption information. In particular, some aspects provide the ability to authenticate users of content to one or more social network services and allow the users to share the identity of the consumed content and other information via the one or more social network services. Herein, a social network service may be, for example, a social network communication service.

One illustrative embodiment relates to a method, including identifying a user consuming content, determining an identity of the content, detecting a reaction of the user to the content, and sharing the reaction with others. In some embodiments, the reaction information may be translated into evaluation information, which is subsequently shared via a social network communication service. Additionally, some aspects of the present disclosure allow for automatic access to one or more social network communication services associated with the user. Also, the disclosure relates to a computing device, including a processor, and memory, storing instructions that, when executed by the processor, cause the computing device to perform steps of the above mentioned and other methods.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

FIG. 4 shows an example interface embodiment in accordance with an aspect of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

By way of introduction, the various features described herein may allow a user to consume content, such as watching a streaming movie, and to automatically share the user's personal reactions to the content with the user's friends. In one example, the user may identify his/her friends by registering one or more social network friends list with the system described herein, and the system may automatically capture the user's reaction to content while the user is viewing the content. For example, the system may employ a facial recognition camera system to recognize the user, automatically log the user in to the various social networks to which the user is subscribed, capture the user's reaction to content (e.g., laughter, crying, whimpers of fear, etc.), and share the user's reactions with the user's social network friends, subject to the user's approval.

Figure 1:
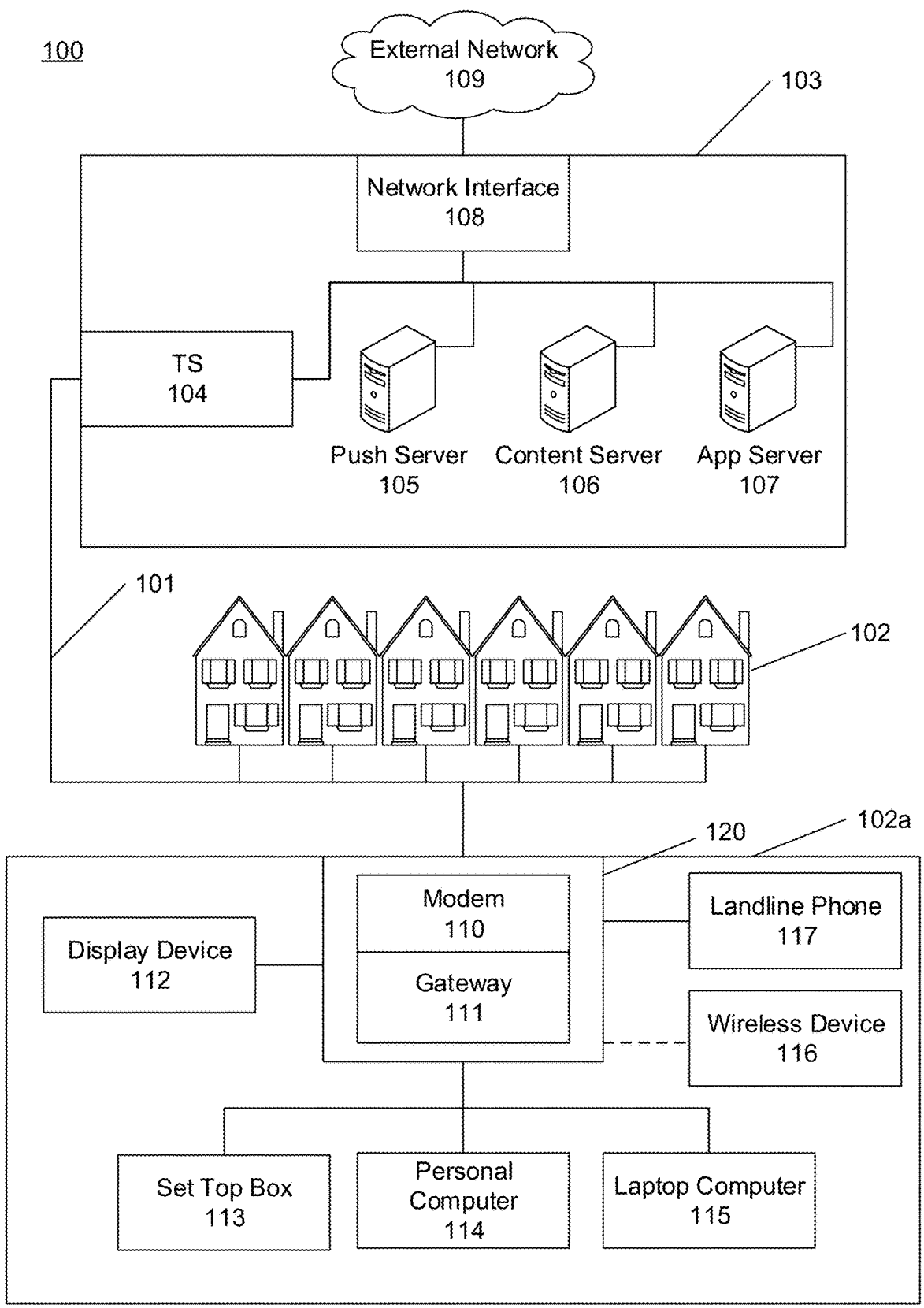
FIG. 1 illustrates an example network on which various features described herein may be used.

FIG. 1 illustrates an example communication network 100 on which many of the various features described herein, such as the requesting and retrieval of content and/or the delivery of user reactions to social networks, may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as information for identifying a user, information for identifying content, and authentication information for authenticating a user to a social network communication service, as a result of performing steps described herein.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local x i-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
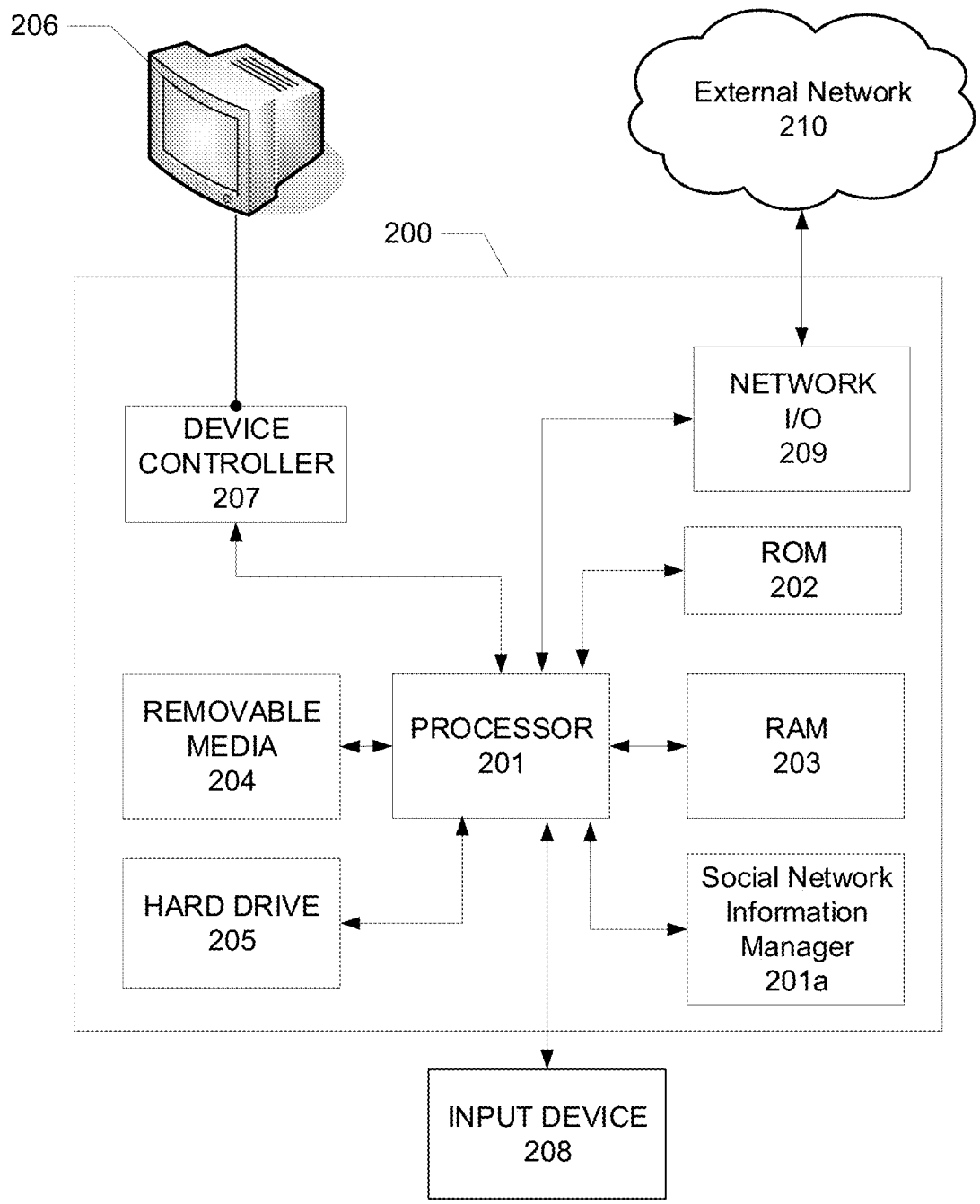
FIG. 2 illustrates an example computing hardware and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, for the authenticating and information sharing processes described herein, the computing device 200 may include a social network information manager 201a, which can perform the various authenticating and information sharing functions described herein as a replacement for, or augment to, any other processor 201 that the computing device 200 may include. That is, the social network information manager 201a may include a separate set of computer-executable instructions stored on a computer-readable medium that, when executed by a processor (e.g., processor 201), cause the processor (or the computing device 200 as a whole) to perform the various authenticating and information sharing functions described herein. The social network information manager 201a may also include secure memory (not shown), which can store the various criteria for authenticating and social network authentication information described herein. The secure memory can be any desired type of memory, and can have enhanced security features to help restrict access (e.g., can only be accessed by the social network information manager 201a, can be internal to the social network information manager 201a, etc.). Where the social network information manager 201a includes a separate set of computer-executable instructions, these instructions may be secured such that only authorized users may be allowed to modify, augment, or delete them.

In some embodiments, the social network information manager 201a may be implemented as an application specific integrated circuit (ASIC). That is, the social network information manager 201a may be a chip designed specifically for performing the various authenticating and information sharing functions described herein. Further, the ASIC may be implemented within or in communication with various computing devices provided herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
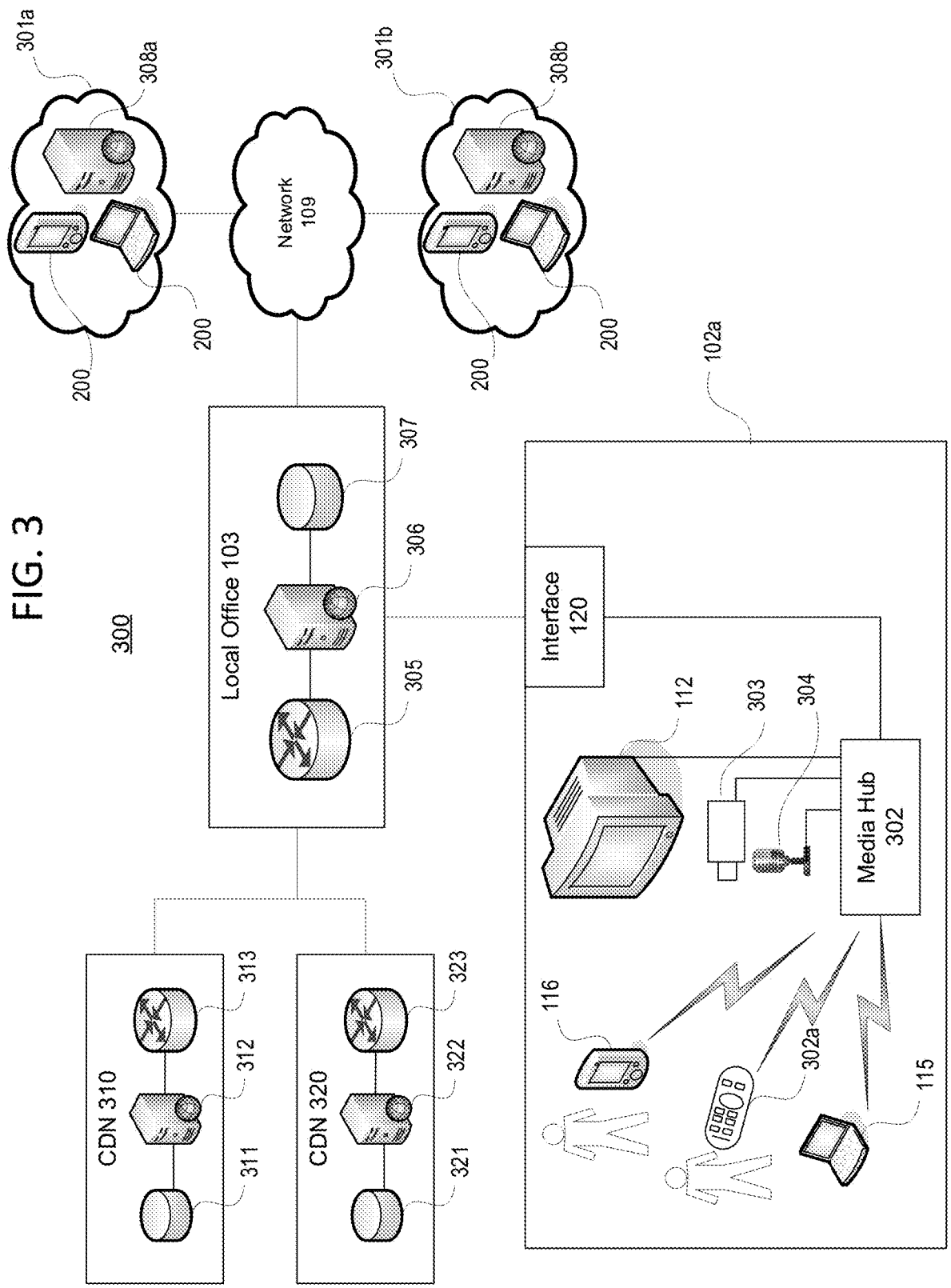
FIG. 3 illustrates a system architecture according to one or more illustrative aspects described herein.

FIG. 3 is a high-level diagram showing an example system architecture 300 on which various features described herein may be performed. The system 300 may include an input device for capturing a user's reaction to content, an interface 120 to communicate with a local office 103, which in turn may communicate with one or more social network communication services 301 (e.g., 301a and 301b) to, e.g., report the user's reaction to his/her friends, and one or more content distribution networks (CDN) 310 and 320 that supply the content to the user (e.g., a network offering a particular movie or streaming video).

Referring to FIG. 3, users (e.g., subscribers) may consume content at a premises 102a (e.g., a home, business, etc.) or outside the premises 102a. Consuming content may include, for example, watching and/or listening to content, such as a television program on a display device 112 (e.g., a television), computer (e.g., a laptop computer 115), or a remote device (e.g., a smartphone 116). The premises 102a may include the interface 120 to connect to the local office 103 so that content can be accessed. The premises 102a may further include a media hub 302 connected to the interface 120. The media hub 302 may provide one or more local device interfaces to communicate with local devices in the premises, and to allow users to select, modify, and/or interact with content retrieved from the local office 103. FIG. 3 illustrates some examples of input devices, namely a tablet or smartphone 116, a laptop computer 115, a remote control device 302a (e.g., a remote controller for the media hub 302, a television remote, etc.), a camera 303, and a microphone 304. Each input device may be configured to collect or receive information or data regarding a user's identity and/or a user's reactions or opinions in response to content. Although FIG. 3 shows some example input devices, different embodiments may utilize different combinations and numbers of input devices. Therefore, in some embodiments, only one input device may be used, while other embodiments may use multiple input devices of the same type. For example, multiple cameras 303 or multiple microphones 304 may be implemented in the same embodiment.

Also, each of the input devices may be configured to communicate wirelessly (e.g., using WiFi) with each other or a designated device (e.g., the media hub 302). For example, two or more cameras 303 may be used to capture a panoramic image, or a microphone 304 may capture audio data which is transmitted to a camera 303 for synchronizing the audio data with an image captured by the camera 303. Further, for example, the remote control device 302a may be WiFi enabled to communicate a fingerprint or image captured through its own touch screen or camera 303 to the media hub 302 to allow the device to recognize the user and log in to or otherwise access the user's social networks, and/or to passively identify and report user reactions to content (e.g., automatically recognizing a facial expression of fear on a viewer's face). The input devices may also allow the users to provide their reactions actively, such as by pressing buttons or typing in commentary. In one or more arrangements, the remote control device 302a may be specially designed to include designated buttons for indicating a reaction, such as whether a user likes or dislikes certain content. In some embodiments, such buttons may be implemented as buttons on a touch screen. Further, in other embodiments, a smartphone with a particular software application downloaded thereon may be used to interface with the designated device (e.g., the media hub 302) to indicate the identity of the user consuming the content and/or a reaction of such a user.

In FIG. 3, the input devices are shown separately for convenience, but one or more of the input devices may be combined. Further, one or more of the input devices may be combined with the media hub 302. For example, the camera 303 may be incorporated into the media hub 302, display device 112, or remote control device 302a. Similarly, the media hub 302 may be incorporated into the interface 120 and/or display device 112. In sum, one skilled in the art would understand that the devices of FIG. 3 may be implemented in many different arrangements.

Still referring to FIG. 3, the local office 103 may contain a router 305 configured to receive and forward digital signals such as requests for content and the content itself; a social network information managing platform 306 for storing and executing computer-executable instructions for performing functions described herein and for providing a web portal described herein; and a database 307 for storing authentication information. Although the router 305, social network information managing platform 306, and database 307 are shown within the local office 103, these components may be external to the local office 103. Where the router 305, social network information managing platform 306, and database 307 are external to the local office 103, the local office 103 may include interfaces for communicating with them. Further, the router 305, social network information managing platform 306, and database 307 may comprise multiple elements. For instance, the database 307 may include multiple blocks of memory that may be in the same location or spread out among any number of locations. The social network information managing platform 306 is shown as a single element, but may include a number of computing devices 200 having one or more social network information managers 201a. Also, the router 305 may include several routers to perform the function of routing content and/or authentication information between a premises 102, one or more CDNs 310 and 320, and devices on the external network 109, including devices belonging to the social network communication services 301a and 301b.

The router 305 of the local office 103 may be used to communicate with the one or more social network communication services 301. Further, the router 305 may forward requests for content from users and/or devices at a premises 102 to one or more CDNs 310 and 320 that can supply the requested content. That is, the router 305 may be used to route upstream data received from the premises 102. Vice versa, the router 305 may also be used to distribute content from the CDNs 310 and 320 to one or more premises 102 in response to the requests.

As illustrated in FIG. 3, each of the CDNs 310 and 320 may include one or more routers 311 and 321, whose purpose is to receive requests from users (e.g., via their local offices) and route them to servers within its network that may store the requested content and be able to supply it in response to the request. A CDN 310 for a given piece of content might have a hierarchy of one primary source, and a plurality of lower-level servers that can store (e.g., cache) the content and respond to requests. The lower-level servers that ultimately service the request may be referred to as edge servers, such as one or more edge servers 312 and 322. The various servers may include one or more content databases 313 and 323, which store content that the respective CDN 310 and 320 manages. In some embodiments, the CDNs 310 and 320 may provide the same or similar content. In other embodiments, the content of the CDNs 310 and 320 may offer different content from one another. Also, the CDNs 310 and 320 may be maintained/operated by the same or different content providers. Although only two CDNs 310 and 320 are shown, many CDNs may be included in the system architecture 300 of FIG. 3.

Additionally, the local office 103 may communicate with one or more social network communication services 301 through the network 109 to sign a user in and to report a user's reactions to the user's friends. The network 109 may be any type of network, including a LAN and/or WAN (e.g., the Internet). The social network communication services 301a and 301b represent different social network communication services, which may be any service, whether opt-in or not, that provides a communication platform to its members. Each social network communication service 301 may include a plurality of computing devices 200, such as personal computers, laptops, tablets, smartphones, PDAs, servers, etc. Any computing device 200 on which a member is signed-in or logged-in on may be considered a part of the social network communication service 301. That is, a member may sign-in to the social network communication service 301a using a laptop, and that laptop may be considered a part of the social network communication service 301 as long as the member is signed-in on the laptop.

Each social network communication service 301a and 301b may include one or more social network servers 308a and 308b, respectively. The social network servers 308a and 308b may store authentication information for each member in their respective social network communication service 301a and 301b. For example, if one million members belong to social network service 301a, the social network server(s) 308a may store usernames, corresponding passwords, and other information for each of the one million members.

Figure 4:
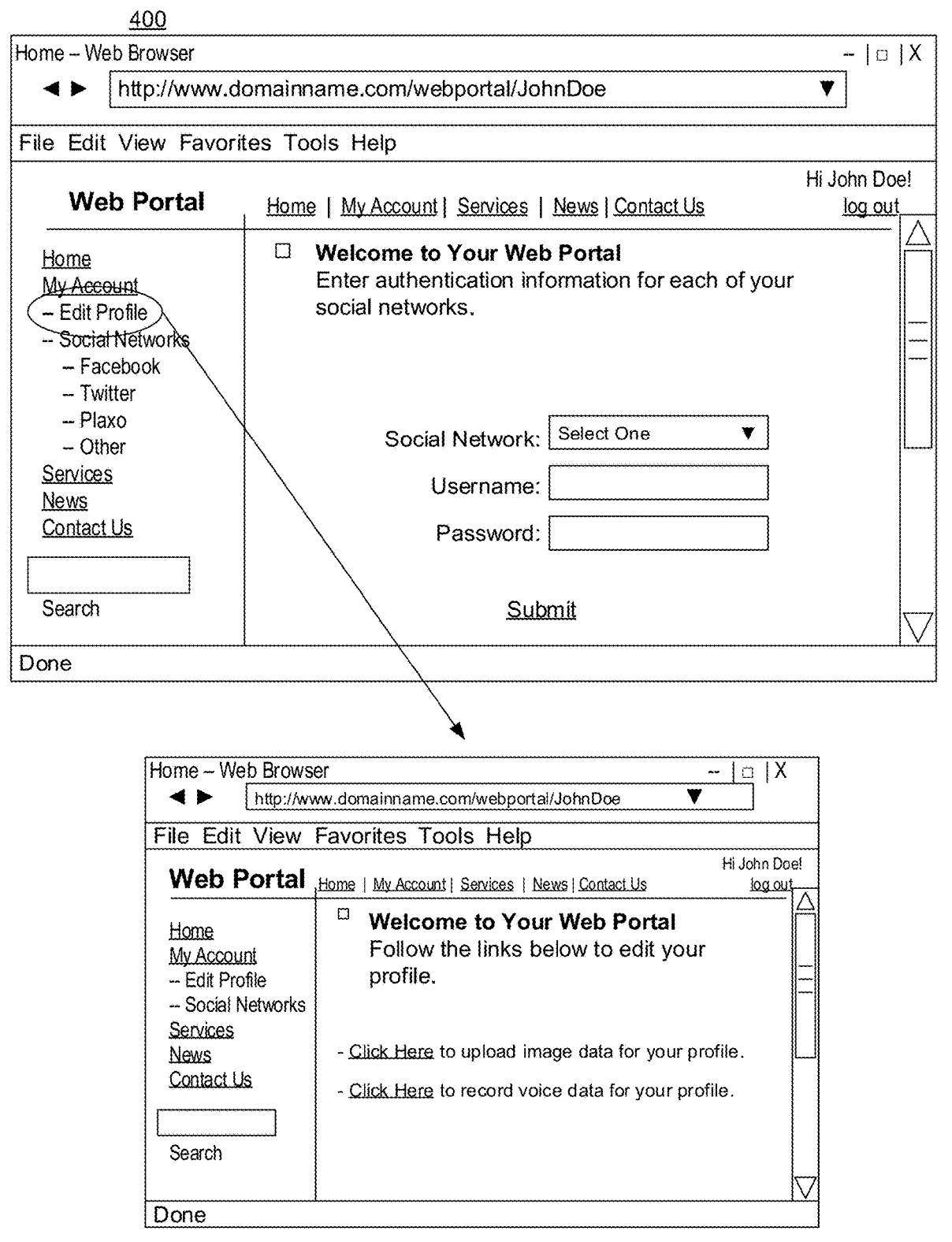

FIG. 4 is a high-level diagram illustrating an example web portal 400 that a user may access to configure the reaction reporting service described herein. The web portal 400 may include one or more webpages provided by a server of the local office 103. Using the web portal 400, users may register for a service that can automatically authenticate the user while they are consuming content and share information related to the user and the content they are consuming via a social network communication service 301. This service may be available to any user whether or not they are a customer of the content provider. Thus, a person who might not be a customer of the content provider may still be able to share information related to the content they have consumed that was provided by the content provider. For example, a friend of a customer of the content provider may share information regarding the content consumed at the customer's house.

To register for the service, a user may access the web portal 400 using a computing device 200. For example, a user can access the web portal 400 using a display device 112 (e.g., television) by selecting an option from an electronic program guide. Or, the user may direct a web browser on a computer to a website that hosts the web portal 400. It should be understood that numerous methods may be used to access the web portal 400. Further, it is not necessary that the web portal 400 be accessed from the same premises 102 at which the content is consumed. A user may access the web portal 400 using a computing device 200 at one premises 102, and consume content at another premises 102.

Once at the web portal 400, a user may select whether to create a new profile or access an existing profile. Profiles may refer to any collection of information that is specific to a particular user. When the user is accessing the web portal 400 for the first time he/she may desire to create a new profile. Various methods may be used to create a profile. In some embodiments, creating a new profile may include capturing an image of the user with a camera or inputting an image of the user from another device. Additionally, or alternatively, creating a profile may include recording the user's voice or inputting a recording of the user's voice from another device. Or, in some embodiments, creating a profile may include collecting fingerprint information. An aspect of the profile may be that it includes some information for automatically identifying a user consuming content.

Using the web portal 400, the user may associate the profile with a name or other identifying information. Further, the user's profile may be populated with authentication information for one or more social network communication services 301 to which the user belongs. That is, through the web portal 400, a user may indicate which social network communication services 301 he/she belongs to. As a result, a server of the local office 103 (e.g. a social network authenticating platform 306), having access to the profile, may be configured to sign onto (e.g., register with) or otherwise access certain social network communication services 301 on behalf of the user. For example, if the user associated with the profile belongs to Facebook, the user may provide his/her Facebook log-in information to his/her profile. As a result, the profile may be accessed in the future to automatically authenticate the user to a social network communication service 301 without the user having to input his/her log-in information each time.

Figure 5:
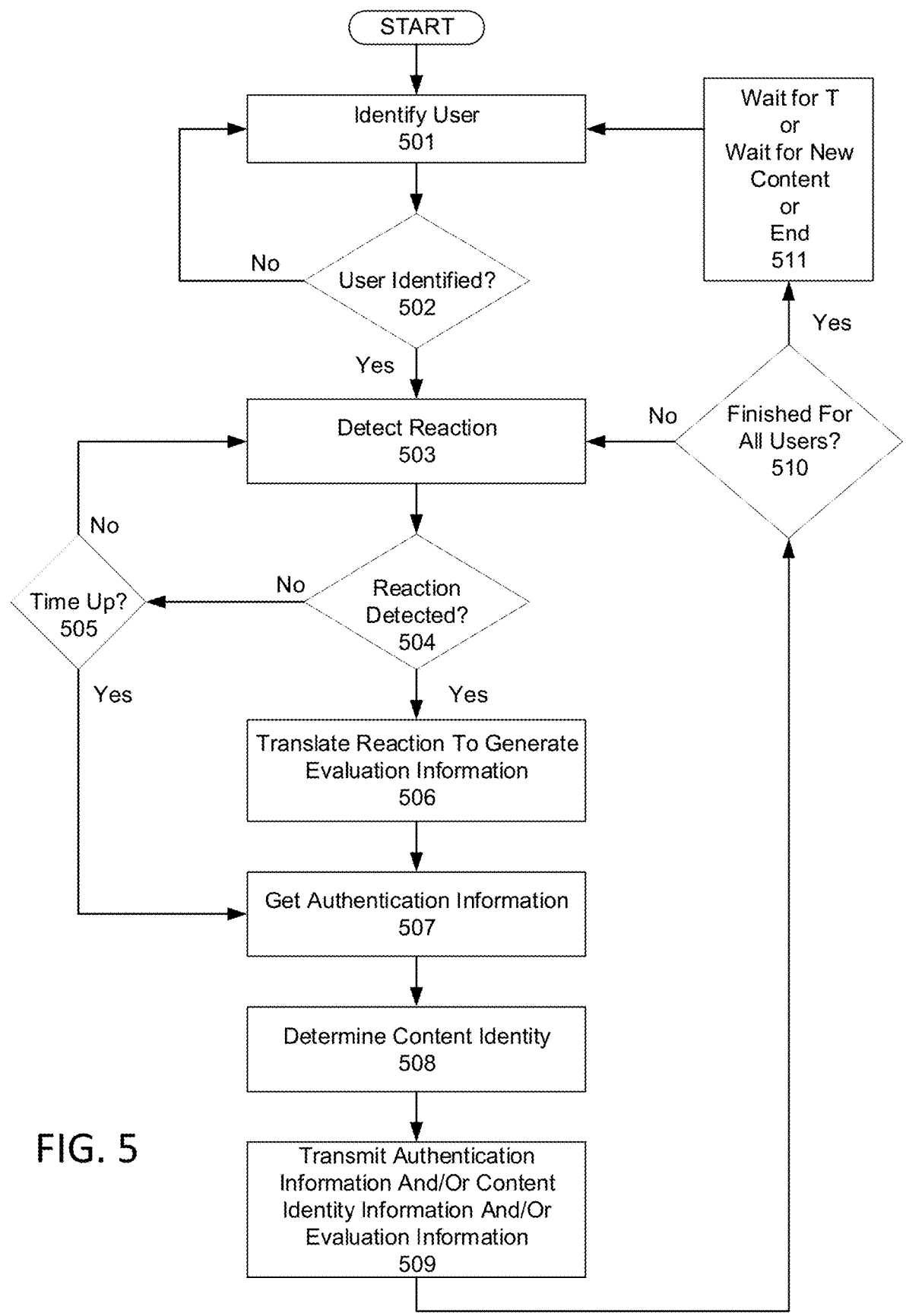
FIG. 5 is a flow diagram illustrating an example method according to one or more aspects of the disclosure.

FIG. 5 is a flow diagram illustrating an example method of the disclosure that may follow the initial configuration discussed above. In particular, FIG. 5 describes an example process of sharing content consumption information on a social network communication service 301. The process in FIG. 5 may be initiated automatically upon power-up of a device in the premises 102 or a device connected to a network enabled in the premises 102a, such as the media hub 302 or display device 112, and/or upon tuning to a particular channel. Alternatively, the process in FIG. 5 may be initiated by a user when that user wishes to share information regarding the content he/she is consuming. For example, the user may use a remote control device 302a to initiate the method. Further, the method may begin when it is determined that content is being streamed or in response to a tag detected within the stream. For example, a device (e.g., a media hub 302) may detect whether a television is streaming content (e.g., a television program, on-demand movie, etc.) or whether a tag exists within the streaming content, and may initiate the process of FIG. 5 in response to the detection. In some embodiments, the process of FIG. 5 may only be performed once content is streamed. As disclosed herein, content may be any type of media, including images, video content, audio content, audio-video content, textual content, Internet pages, etc.

Once initiated, the method begins with step 501 in which one or more users consuming the content are identified. Herein, a user who consumes content may be any user who views, listens, or otherwise receives the benefits of the content. For example, a person watching a streaming video program may be a user consuming content. The identification of users in step 501 may be restricted to identifying customers in some cases. However, in other cases, any user, whether they are a customer of the content provider or not, may be identified. Various processes may be used to determine the identity of a user. The processes for identifying users should not be limited to those described herein. It is contemplated that the methods described herein may be compatible with many other processes for identifying users, including those developed in the future.

In some embodiments, image processing may be performed in step 501. For example, a camera 303 may be used to take a picture of whoever is in front of the display device 112 (e.g., television). Facial recognition may be used to evaluate the captured image and determine the identity of those in the image. Any facial recognition process may be used to identify the users. Where multiple users are consuming content at the same time, image processing can be performed to distinguish the multiple users.

In some embodiments, a microphone 304 may be used to record audio signals in proximity to the display device 112 streaming the content. Then, voice recognition may be performed to determine whose voices were recorded. The results of the voice recognition may be used to identify the users who are consuming the content.

Another process for identifying the user in step 501 may include detecting biometric data, such as the fingerprint of a person holding a remote control device 302a (e.g., television remote), which may be configured to operate the display device 112 streaming the content, or other device (e.g., a smartphone). The remote control device 302a, or other device, may be equipped with a camera, such as a fingerprint reader, for detecting the fingerprint, and the detected fingerprint may be used to identify the user.

Still another process may implement a camera, such as a retinal scanner, for scanning the eyes of users to identify them. The retinal scanner may be incorporated into the remote control device 302a, display device 112, media hub 302, smartphone, or any other device.

Further, in some embodiments, the user may have the option of identifying themselves. For example, a user may speak their name to a certain device (e.g., a media hub 302)

at a certain time (e.g., when a display device 112 is turned on or when prompted). In another example, users may identify themselves by operating a remote control device 302a to select their identity from a list of identities.

It should be understood that any of the above processes for identifying a user may be used in combination. Additionally, the devices used in the different processes for identifying the user may be implemented in various manners. For example, the camera 303 or microphone 304 may be a camera or microphone on a smartphone 116 or other computing device (e.g., laptop 115) that is in communication with a media hub 302, which is also in communication with the display device 112.

Next, at step 502, the process determines whether a user was identified. Step 502 may begin at some predetermined time after step 501 begins. That is, it is not necessary for step 502 to wait until step 501 is completed. In some cases, no users may be identified in step 501 at the time of the determination in step 502, and therefore, step 502 may end the process of FIG. 5 or, as shown in FIG. 5, may return the process back to step 501 to attempt to identify users again. On the contrary, if users are identified (Yes at step 502), then the process may proceed to step 503.

In some embodiments, step 502 may determine whether the users identified in step 501 are a member to a particular service for sharing information related to their content consumption or have given permission for such information to be shared. Therefore, even if a user is identified in step 501, step 502 may end the process of FIG. 5 or cause step 501 to repeat, if the user identified does not wish to share information regarding their content consumption. Where the identified user has previously declined to give permission or never signed-up for the service that allows sharing of their content consumption information, step 502 may prevent the process of FIG. 5 from continuing to obtain content consumption information.

Also, in some cases, a user may temporarily disable the process from sharing its consumption information. For example, a user may use the web portal 400 to prevent reactions to be detected when he/she is consuming content that he/she does not wish others to know about. If the user disables the process from sharing consumption information, step 502 may also prevent the process from continuing to obtain the content consumption information and end the process of FIG. 5, or repeat steps 501 and 502 until a user is identified who is willing to share their content consumption information.

In step 503, a reaction of a user may be detected. Herein, a reaction may refer to any movement, noise, or other manner of indicating a user's opinion or response (whether intentional or not). For example, a reaction may be an action, such as walking away, turning away, closing one's eyes, etc. or gestures, such as giving a thumbs-up sign or thumbs-down sign, indicating a number with one's fingers, etc. Other example reactions include crying, laughing, smiling, nodding, head shaking, sleeping, yawning, screaming, etc. A reaction may be detected using, for example, image recognition processes or audio recognition processes similar to those discussed above for identifying a user. For example, step 503 may include capturing an image using a camera 303 and performing image recognition processes, such as pattern recognition, to detect whether a person is smiling or yawning. Or, for example, step 503 may include capturing audio using a microphone 304 and performing an audio recognition process to detect whether a person is laughing or snoring.

When reactions are detected while content is being consumed, it may be assumed that the reaction is in response to the content. However, in some embodiments, only certain reactions may be detected. The method may be tailored to detect only a set of reactions that are expected to be in response to content. For example, smiling and laughing, but not reactions of fear (e.g., screaming), may be detected during a comedy program. Thus, in some embodiments, the method may avoid sharing reactions that are not related to the content being consumed. Specifically, the genre and/or rating of the content, as indicated by an electronic program guide for example, may be extracted and used to determine a list of acceptable reactions. Based on this list, the detected reactions may be filtered so that only those reactions determined to be acceptable are recorded and/or reported. For example, image processing techniques may be used to filter captured images so that images of laughter as opposed to images of screaming are recorded and/or reported during a comedy program.

Moreover, the web portal 400 may also be used to set which types of reactions may be detected and/or reported. Therefore, if a user is watching a sad movie, he may customize settings through the web portal 400 to prevent the process from reporting that he cried while allowing the process to report that he laughed. If the user has entered such settings, step 503 may be optimized to detect only certain reactions and may repeat until a reaction the user is willing to share is detected.

To facilitate image recognition processes for determining a user's reaction, a training process may be employed to teach the system 300 how to recognize certain reactions of a specific user. For example, a user may train the system to recognize when he/she is smiling by smiling when prompted so that characteristics of the particular user's smile may be obtained. Alternatively, a user may upload various photos exhibiting a variety of reactions. For example, a user may upload photos of the user smiling, expressing anger, screaming, expressing sadness, etc. Image recognition techniques may then be implemented to determine a degree of confidence based on a comparison of the reactions captured while the user is consuming content and previously uploaded photos. The degree of confidence may then be compared with a threshold to determine whether the reaction should be deemed to have occurred. If the degree of confidence is higher than the threshold value, then the reaction may be deemed to have occurred. This training process may be performed through the web portal 400 and the results may be stored in a specific user's profile for future use in detecting whether the user is smiling.

Similarly, the audio recognition processes may be trained to detect the particulars of a user's laugh or scream. That is, a training process may be performed in which the user laughs, screams, or makes other sounds that might aid the voice recognition process to determine a user's reaction.

To detect a reaction, step 503 may utilize a database with predefined reactions and associated characteristics. Accordingly, once data is obtained in step 503, the data can be compared to data in a database to determine if there is a match. In this manner, step 503 may determine which of the predefined reactions correspond to the obtained data. For example, if an image is input in step 503, the image may be processed to extract a pattern from the image and that pattern may be compared to patterns stored in the database. If the pattern extracted matches a pattern in the database, then step 503 determines that the reaction associated with the matching pattern in the database was detected.

Next, at step 504, whether a reaction was detected at step 503 is determined. If it is determined that no reaction is detected in step 503 (No at step 504), whether because the process performed did not detect a reaction or because a user did not have a reaction, the process of FIG. 5 may proceed to step 505. In step 505, whether a certain amount of time has passed from the time that step 503 was first performed in the present iteration may be determined. Step 505 may be implemented to prevent the process of FIG. 5 from endlessly looping back to detect a reaction. In some cases, where the user is not reacting or his/her reactions are not successfully detected in step 503 after a certain time (Yes at step 505), the process may proceed to step 507. Until this certain time is up, however; step 505 may cause step 503 to be repeated.

Returning to step 504, if a reaction is detected in step 503 (Yes at step 504), then the reaction may be translated into evaluation information at step 506. Translating a reaction into evaluation information in step 506 may include generating data that indicates the user's reaction. Specifically, data representing an alphanumeric string may be generated. For example, if the reaction detected in step 503 is that the user laughed, then step 504 may be performed to generate data representing a message such as "laughing out loud" or an abbreviated message, such as "lol." Or, for example, if the reaction detected in step 503 is that the user put his/her thumb up, then step 504 may be performed to generate data representing a message such as "one thumb up."

In some embodiments, the evaluation information may be data representing a certain predefined expression that is specifically used within a social network communication service 301. In other words, the evaluation information may be data including instructions for causing a social network communication service 301 to post a predefined expression used by that particular social network communication service. For example, on Facebook one can "like" or "dislike" certain objects, and thus, if the evaluation information is to be sent to Facebook, the evaluation information may be data that instructs Facebook to indicate whether the user likes or dislikes the content consumed. To facilitate this, the database used for translation may include predefined instructions for one or more social network communication services 301. For example, if the Facebook application has a predefined gesture of "Thumbs Up"="Like" and "Thumbs Down"="Dislike", then the reporting of the thumbs up/down may result in a corresponding like/dislike on the user's profile.

In some aspects of the present disclosure, the evaluation information may be sent to multiple social communication services 301. Accordingly, where different expressions are used in different social communication services 301, the evaluation information may be generated to include instructions for each of the social communication network services 301. The evaluation information may be generated in a standard format regardless of the social communication network service 301 and later parsed by the social communication network service 301 or another device in the network (e.g., the social network information managing platform 306), or may be embedded into separate messages (e.g., packets) addressed to the different social network communication services 301.

In some embodiments, rather than posting each individual reaction, a plurality of reactions may be aggregated to determine a number of laughs, a number of thumbs up/down gestures, a number of screams, etc. The aggregated data may then be translated into a summary, which may be posted to the social network communication service 301. By reporting a summary, reporting of outlier reactions may be suppressed. For example, if one user consuming content tells another user consuming the content a joke causing that user to laugh, the user's laugh could be incorrectly detected as a laugh in response to the content. To address this and similar scenarios, the reactions may be aggregated, so that reactions are only reported if statistical results of the aggregate data indicate the reactions are representative of the user's reactions to the content. It should be understood that various statistical models may be implemented to achieve this goal and that the statistical models may evolve as data is collected.

In step 507, authentication information may be retrieved from storage (e.g., from a local cache at the media hub 302 or the database 307) or otherwise obtained to allow the server to post a social network message on behalf of the user. The authentication information may be specific to the user identified in step 501. Moreover, the authentication information may include log-in (or sign-in) information, such as a username and password, of the specific user for a certain social network communication service 301 that the specific user belongs to (e.g., is a member of). For example, if the user identified in step 501 belongs to Twitter, the user's log-in information for their Twitter account may be retrieved from storage.

In step 508, the identity of the content is determined. Determining the identity of the content may include, for example, determining the name of a television program or on-demand movie, or determining the opponents in a televised sporting event. Step 508 may be performed by detecting a service identifier (e.g., a channel number, content provider code, etc.) of the content being consumed at a certain time, and converting the service identifier to obtain the identity of the streamed content based on a region code (e.g., a zip code) in which the user is consuming the content and a provider's content schedule. In one or more arrangements, the identity of the content may be determined by the media hub 302 or display device 112 through which the content is streamed. Alternatively, the service identifier and region code may be transmitted upstream to the local office 103, which may compare the received service identifier and region code with the provider's schedule and determine the identity of the content. Further, the reaction may be tied to a scene of the content being consumed by bookmarking the time within the content the reaction was detected and posting it to the social network communication service 301. In some examples, the posting may include a link such that a person clicking on the link would be directed to the scene that prompted the user's reaction.

In step 509, the authentication information and information identifying the content may be transmitted from the premises 102 or local office 103 to a specific social network communication service 301. Additionally, the evaluation information may also be transmitted to the social network communication service 301 in step 509. In some embodiments, where the user belongs to multiple social network communications services 301, different authentication information related to each social network communication service 301 may be transmitted in step 509. For example, authentication information for one social network communication service 301*a* may be transmitted to a server 308*a* of that social network communication service 301*a* while authentication information for another social network communication service 301*b* may be transmitted to a server 308*b* of that other social network communication service 301*b*. Meanwhile, the same information indicating the identity of the content and/or evaluation information may be transmitted to the different social network communication services 301. Thus, it is possible for a user to share what content they are watching and/or their reactions to such content on multiple social network communication services 301. For example, as a result of steps 501-509, a user may share their satisfaction or dissatisfaction with the content they are consuming on their social network communication service(s) 301 for others to see.

Furthermore, at step 509, the evaluation information and/or information identifying the content may be transmitted to a third party, such as a content creator. For example, the evaluation information and/or content identity information may be routed by the router 305 of the local office 103 to a content creator (e.g., the creator/administrator of a television show, television network, or advertisement). Thus, a content creator can evaluate what type of reactions their content is generating. In some embodiments, a computing device 200 at the local office 103 may process the reactions for the specific content and generate statistics (e.g., most common reaction, least common reaction, etc.), which it subsequently provides to the content creator or provider. Specifically, the computing device 200 at the local office 103 may aggregate reactions from a plurality of users (e.g., on a scene by scene basis), generate statistics from the aggregate data, and transmit the statistics to content creators.

An aspect of the present disclosure is to authenticate multiple users, who are consuming the same content at the same time in the same location (e.g., via the same display device 112), to their respective social network communication services 301. Further, another aspect of the present disclosure is to detect the reactions of the multiple users. Accordingly, after step 509, the process may proceed to step 510 in which it is determined whether reaction information has been detected and posted to a social network communication service 301 for each user identified in step 501. If, at step 510, it is determined that the process has not been completed for all identified users (No at step 510), then the process may loop back to repeat steps 503-509 for a next user. While the process may return to step 503, it should be understood that in some cases the reaction of another user may be detected from the same information previously obtained in step 503. Therefore, for example, if an image was captured in step 503 to detect a reaction, another image might not be captured when step 503 is repeated because the reaction information for each of the identified users might be obtained from the same image.

Meanwhile, if it is determined that the process has been completed for each user at step 510 (Yes at step 510), the process may proceed to step 511. Aspects of this disclosure further recognize that a user may have multiple reactions to different segments of the same content. In other words, it is recognized that a user may like one segment of content and may dislike another segment of the same content. Accordingly, steps 501 through 509 may be repeated. As shown in FIG. 5, in step 511, the process may wait a set period of time T (e.g., a predetermined time) before returning to step 501. Moreover, at step 511, the process may determine whether it is time to check for a new reaction. That is, the system may record a running time to keep track of how much time has passed since the last time detection of a reaction was performed (e.g., how much time has passed since performing step 503). In step 511, this recorded time may be compared to a predetermined time or to one of a number of predetermined times depending on the type of content. The predetermined times may be set by a user consuming the content, system administrator, system architect, content provider, or content creator according to how much time is desired to pass between collection of a reaction to the same content. Thus, the predetermined times may help to manage congestion and to avoid receiving multiple consecutive reports of what is essentially the same reaction. For example, the predetermined time may be set so that a reaction to the same content can be detected every 10 minutes. Also, the predetermined time may be different depending on the content. For example, in a half hour television show, the time between reaction determinations may be shorter than that of an hour long television show. Therefore, it should be understood that the set wait time T may vary.

After the set period of time T, the process may proceed to step 501 to identify users again. As a result, additional reactions from the same user(s) (i.e., previously determined users) may be obtained. Also, because the process returns to step 501 after the set wait time, the process can check to see if a new user has begun consuming content. That is, the process of FIG. 5 takes into consideration the fact that another person may later join the initial person in consuming content (e.g., watching a television program or otherwise streaming video content).

In some embodiments, an input device (e.g., the camera 303, microphone 304, etc.) may be configured to capture inputs (e.g., images, sound recordings, etc.) periodically with constant intervals of time equivalent to the set period of time T. That is, firmware of the input device may include instructions that when executed cause the input device to capture inputs periodically, and transmit the captured inputs to a server at the local office 103. Alternatively, a device at the local office 103 (e.g., the social network information managing platform 306) may include a clock and counter for determining time intervals equivalent to the set period of time T and transmitting a signal at the time intervals to cause an input device to capture inputs for detecting a reaction. For example, the social network information managing platform 306 may generate a signal that instructs the firmware of the camera 303 to capture an image periodically at intervals equivalent to the set period of time T. Although constant intervals are described by way of example above, it should be understood that inputs may also be captured at irregular intervals. Further, in some embodiments, a device at the local office 103 may send the input device a set of times when content is started so that the input device may record inputs according to the received set of times.

Also, because the process may loop back to step 501, step 501 may monitor the presence of an identified user. In some embodiments, it may be of interest to monitor a user's presence to determine whether the user is still consuming content. In such cases, a subsequent step 501 may determine whether the same user, who was previously identified in step 501, is still consuming content. In other words, when the process loops back to step 501, it may determine whether one of the users currently consuming content matches one of the users previously identified. If a match is not found, then the process may determine that the user has stopped consuming the content. In this case, the process may end. Alternatively, if no match is found, the process may transmit information indicating that the user has stopped consuming the content to the social network communication service(s) 301, which were communicated with in step 509, or to a third party. For example, if a user walks away from a television after a previous iteration of step 501 and is not present when step 501 is repeated, the process may determine that the user has stopped consuming the content and may record this determination or transmit this determination so that others may be informed that the user has stopped consuming the content.

From the above description, it should be understood that the process may perform steps 503-509 for each user before returning to step 501 to identify users again. Therefore, for example, where a group of friends and/or a family is watching the same television program on the same television, the reaction of each user may be detected and posted to social network communication services 301 of each user by performing steps 503-509 for each user. Thus, a first user's reaction to a television program may be reflected on the first user's social network communication service 301, while a second user watching the same television program at the same location (e.g., premises 102) may have a second reaction which is reflected on the second user's social network communication service 301. Here, the first user's reaction may be different than the second user's reaction.

Referring to step 511, in some embodiments, step 511 may monitor the content being consumed. Aspects of this disclosure recognize that a user may select different content to consume, and that it may be desirable to capture a user's reaction to more than one piece of content. Still other aspects of the disclosure may aim to detect a scenario in which a user does not change a channel, but the content being streamed on the channel changes. To accommodate for these observations, step 511 may include other manners of controlling when to return to step 501.

At step 511, instead of waiting a set period of time T before causing step 501 to be repeated, the process may determine the identity of the content and determine whether the content has changed. For example, the identity of a streaming video program (e.g., name and/or description of a television program or name and/or description of an on-demand movie) may be determined at step 511. Step 511 may include any of the manners explained with respect to step 508 herein.

In some embodiments, instead of detecting the identity of the content, step 511 may simply monitor a service identifier (e.g., channel number) and determine if the service identifier has been changed. Because the content will likely change if the service identifier is changed, the determination that the content has changed may be made more quickly and/or less costly in terms of processing power by inferring a content change from detecting a change in the service identifier.

If the process at step 511 determines that the content has changed, then the process of FIG. 5 may return to step 501 and may repeat steps 501-509. In some embodiments, step 501 might not be repeated for every change in content. That is, step 511 may detect when a user is channel surfing so as not to cause steps 501-509 to repeat. For example, step 511 may only cause the process to proceed to step 501 after determining that the user has been consuming the same content for a certain period of time (e.g., a predetermined period of time).

Although FIG. 5 shows that the process may return to step 501 when the predetermined time is exceeded, it may be assumed that the users consuming the content have not changed, and thus, the process may proceed directly to step 503 to detect a reaction (as opposed to step 501).

Further, in some embodiments, step 511 may simply end the process. Although the current process may end in step 511, it should be understood that the process may be re-initiated as described above.

The steps in FIG. 5 may be performed in the order as shown, or may be rearranged. For example, determining the identity of the content in step 508 may be performed before step 501. Further, one or more steps may be omitted, added, or repeated. Also, the steps of FIG. 5 may be performed by one or more computing devices 200. For example, steps 501-511 may all be performed by a device at the premises 102 (e.g., a display device 112, media hub 302, or other device). Alternatively, all of the steps may be performed by a device at the local office 103 (e.g., at the social network information managing platform 306). That is, all of the data inputted at the premises 102, such as an image captured by a camera 303, may be transmitted to the local office 103 for performing the steps 501-511. Still, in other embodiments, some of the steps may be performed at the premises 102, while other steps are performed at the local office 103. For example, steps 501-505 may be performed by a device at the premises 102 (e.g., a media hub 302), and the evaluation information and/or user identification information may be transmitted to the local office 103, where another computing device 200 (e.g., the social network information managing platform 306) may perform steps 506-511.

Figure 6:
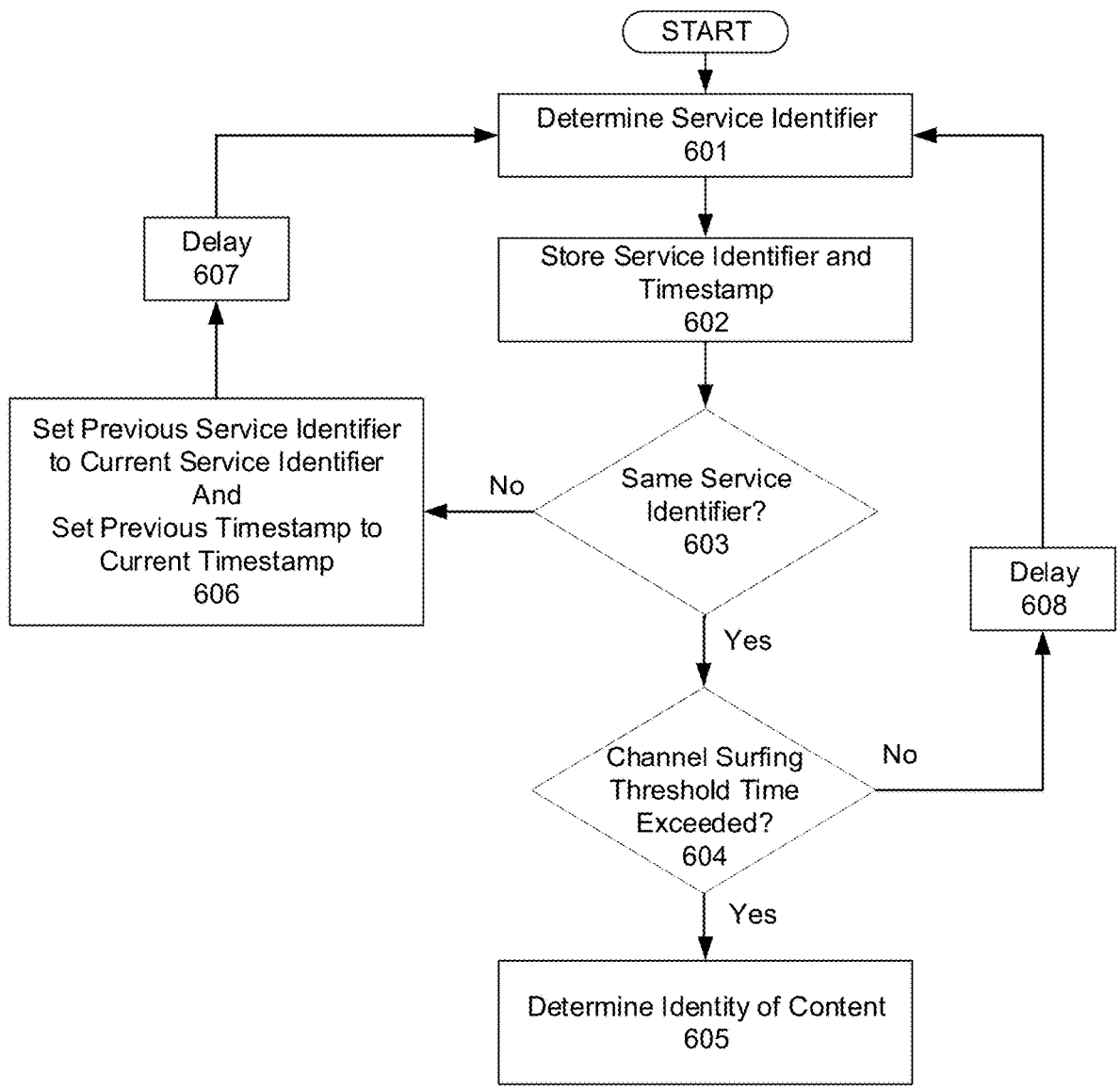
FIG. 6 is a flow diagram illustrating an example method according to one or more aspects of the disclosure.

FIG. 6 illustrates an example process for identifying content. In some embodiments, the process of FIG. 6 may be implemented in step 508 and/or step 511 of FIG. 5. An aspect of this disclosure may be to prevent excessive processing when a user is channel surfing. In other words, when a user is channel surfing, it may be undesirable to identify and share reactions to content that the user only views for a short period of time. In light of this observation, the process of FIG. 6 and other processes may be implemented in some embodiments of the methods of sharing content consumption information.

The process of FIG. 6 begins with step 601 in which a current service identifier (e.g., identification of the program, video provider, or television station that is being watched) is determined. This information may be obtained from a remote control device 302a (e.g., television remote), a display device 112 (e.g., television), or a media hub 302. Once the current service identifier is determined, this service identifier is stored (e.g., in a buffer) along with a timestamp at step 602. The timestamp may be generated using a clock that provides a real time (e.g., Universal time) or a clock signal from an internal or external clock generator. Then, in step 603, the process determines whether the current service identifier is the same as a previously stored service identifier. If the service identifiers are the same, the process proceeds to step 604. At step 604, it is determined whether a channel surfing threshold time has been exceeded. Exceeding the channel surfing threshold time as described herein indicates that the user is not channel surfing. Step 604 is performed by comparing the difference in time between a previous timestamp and the current timestamp. If this difference exceeds the channel surfing threshold time, then it is determined that the user is not channel surfing and the process proceeds to step 605. In step 605, the identity of the content is determined based on the service identifier, a region code (e.g., a zip code) associated with a location (e.g., a premises 102) where the content is consumed, and a content distribution schedule corresponding to the region code.

If the process determines that the current service identifier and the previous service identifier are not the same at step 603 (No at step 603), then the previous service identifier and previous timestamp are set to the current service identifier and current timestamp, respectively at step 606. From step 606, the process proceeds back to step 601 after a delay of a predetermined time at step 607. Depending on the predetermined time of the delay at step 607, a user may flip back and forth between two or more channels without causing the process to determine that the user is channel surfing. In some embodiments, the process may be performed so that the user can flip back and forth between several channels without resulting in a determination that the user is channel surfing, and thereby allow the remaining steps of the process to authenticate the user and share information regarding the user's content consumption.

Further, a determination at step 604 that the channel surfing threshold time is not exceeded (No at step 604), is an indication that the process has not ruled out the possibility that the user is channel surfing. Therefore, if the threshold is not exceeded, the process returns to step 601 after a delay at step 608. Although FIG. 6 shows the process proceeding through the delay 608, which is separate from the delay 607, when the threshold is not exceeded, the delays 607 and 608 may be the same in some embodiments.

Figure 7:
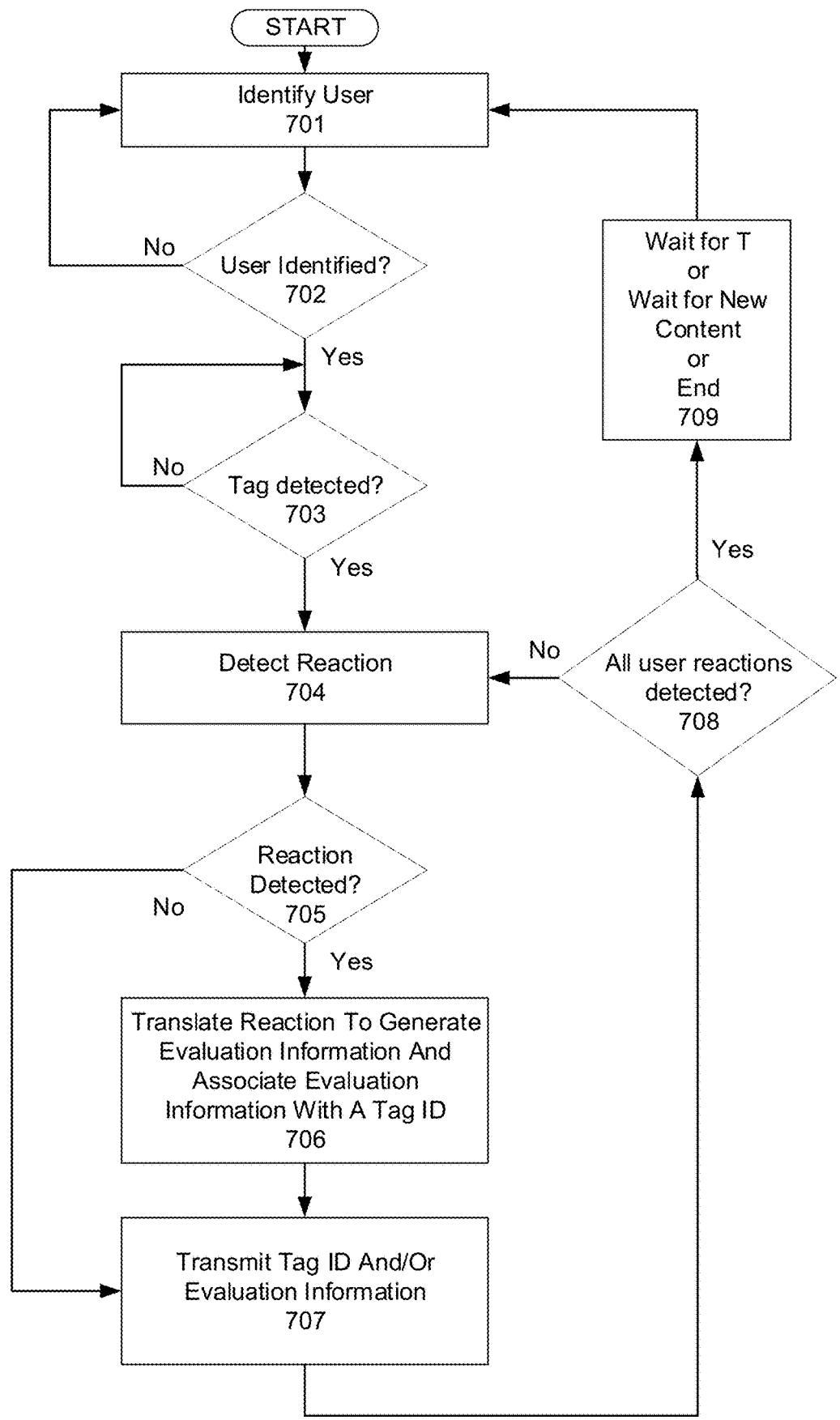
FIG. 7 is a flow diagram illustrating an example method according to one or more aspects of the disclosure.

The example implementation discussed above includes a looping, continuous process of checking for user reactions. In some embodiments, the content may include (or be associated with) data triggers that indicate when certain reactions are expected or desired. FIG. 7 is a flow diagram illustrating another example method of the present application, in which tags are used to trigger a reaction detection process. The process in FIG. 7 may begin when a user begins to consume content. For example, step 701 may be initiated when a user turns on a display device and/or when content is presented, e.g., starts streaming Additionally, or alternatively, step 701 may only be initiated after the same piece of content has been continuously consumed or streamed for a certain period of time. In some embodiments, step 701 may be triggered by the completion of step 604 in FIG. 6 (e.g., after it is determined that a user is consuming content and not channel surfing).

Step 701 may identify one or more users consuming the content (e.g., one or more people watching the television). Step 701 may perform any of the processes discussed herein to identify the user(s), such as audio recognition processes (e.g., voice recognition) and image recognition processes (e.g., facial recognition).

Next, in step 702, whether the identified user(s) is a valid user is determined. A valid user may be any user who has signed-up for, or has otherwise given permission to be a part of, a specific service that collects information about a user's content consumption. Additionally, or alternatively, the determination at step 702 may simply determine whether or not a user was even identified at step 701. For example, if step 701 is performed but a user is not identified, step 702 may return the process to step 701 until a user is identified. This part of the process may account for a scenario in which a user has initiated the streaming of content but is not actually consuming the content. For example, a user may turn on a television and immediately walk away. In such an example scenario, steps 701 and 702 may be performed repeatedly until the user returns.

Step 703 determines whether a tag has been detected. Effectively, step 703 monitors the content to detect a tag. Tags may be data packets inserted into content by content providers or content creators for the purpose of triggering the collection of reaction information. A content creator (or content provider) may insert a tag at a particular point in the content where the content creator would like to learn the reaction of the users to the content. Specifically, for example, a content creator or content provider may operate a computing device 200 to identify segments within content as reaction-generating segments. In other words, a content creator or content provider may identify segments of content that they would like to capture a reaction for or expect to generate a reaction. For example, a content creator or content provider may insert a tag in an advertisement to facilitate collection of user reactions to the advertisement. In another example, a tag may be inserted into a particularly scary scene of a horror movie, such as at a point where a suspected killer is shown suddenly jumping out from hiding.

In one or more embodiments, the timing of each tag may be transmitted to an input device (e.g., a camera 303, a microphone 304, etc.) instructing firmware of the input device to capture inputs (e.g., images, sound recordings, etc.) so that reactions of the users can be correlated with the tags as described herein. Further, the tags may be positioned within the content at appropriate points so that input devices may capture the appropriate reaction. For example, a tag may be placed in content at a point five seconds prior to when the reaction is desired so as to allow time for a media hub 302 to instruct an input device to capture the reaction desired. Also, tags may be configured to cause a specific input device (e.g., a camera 303, a microphone 304, etc.) to capture a specific type of reaction. For example, in the case of the horror movie, a tag may be inserted into the horror movie to capture audio data via a microphone 304 during a particularly scary point to detect whether a user screams. In another example, a tag may be inserted during a reality game show at a particular point to trigger a camera 303 to capture a user's hand gesture so that the user may vote for a contestant.

As shown in FIG. 7, step 703 may be performed repeatedly to continuously monitor the content until a tag is detected. In some embodiments, a delay may be implemented between each repetition of step 703 to reduce processing power. Also, step 703 may be modified to stop monitoring the content after a certain amount of time to prevent an endless search for tags, which might not exist in the particular content or which might go undetected.

In response to detecting a tag (Yes in step 703), the process proceeds to step 704 in which a reaction is detected. Detecting a reaction may comprise performing an image recognition process or audio recognition process. For example, step 704 may trigger a camera to capture an image of the user(s), and that image may be analyzed to determine whether a user is giving a thumbs-up or thumbs-down sign.

In some embodiments, the tag may be designed to instruct a device (e.g., the media hub 302) to look for a particular reaction. For example, the tag may cause the media hub 302 to detect whether a user consuming content has laughed or not. Where the tag is designed for a specific reaction, step 704 may only search for that reaction. Therefore, for example, if a tag designed to detect whether a user is laughing is received, step 704 may not detect if the user just smiles. Similarly, the tag may also be designed to detect only reactions from a particular type of user (e.g., a female user). For example, a tag may be designed to see how only female users responded to a particular segment of content that is targeted for females (e.g., advertisements for female beauty products). Thus, step 704 may only be performed for a specific user where such user is of the type specified by the tag. Accordingly, tags may assist in collecting and classifying different users' reactions to content.

Moreover, operations of devices at a premises 102 may be controlled in response to receiving a tag that is specially designed to acquire certain reaction information. For example, if a tag is designed to capture laughter, the media hub 302 may operate only the microphone 304 to capture audible reactions. Alternatively, if a tag is designed to ascertain a user's attention to particular content, only the camera 303 may be operated to capture an image which may then undergo facial recognition to determine whether the user was facing the content (or camera 303 which may be positioned at a known point with respect to the content). In this case, a microphone 304 may not be turned on or otherwise operated to acquire audio reactions.

Once step 704 is completed, step 705 is executed to determine whether a reaction was detected. If a reaction was detected (Yes at step 705), the process proceeds to step 706. However, if a reaction was not detected (No at step 705), the process skips step 706 and proceeds directly to step 707.

In step 706, the detected reaction may be translated into evaluation information. The evaluation information may be any type of data that indicates the reaction. For example, evaluation information may be a string, such as "two thumbs-up" or "I give it a 10," or an image, such as a graphic of a smiley face. A database may be employed to execute this translation. The database may store typical characteristics (e.g., typical image or audio patterns) and/or user specific characteristics (e.g., patterns obtained from performing training processes or previous determinations with respect to a specific user) in association with evaluation information, such as a descriptive text and/or image. This database may be configured to be searchable so that the characteristics of the database can be compared with characteristics obtained from the detected reaction. Further, the database may be configured so that when a match is found, the evaluation information may be read.

In some embodiments, it may be more practical, efficient, and/or desirable to translate the reaction detected into data indicating the reaction. For example, a user may not want a picture of their reaction to be shared, but may be willing to share other information indicating the user's reaction, such as a smiley face.

Additionally, step 706 may also associate a tag identifier (e.g., tag ID) with the evaluated information. For example, step 706 may generate a packet that includes a tag ID and evaluation information. Fields within the packet may be predefined so that it can be determined which part of the packet corresponds to the tag ID and which part corresponds to the evaluation information. For example, the packet may include eight bytes, where the first four bytes contain the tag ID and the last four bytes contain the evaluation information.

Subsequently, in step 707, information may be transmitted from a premises 102 to a local office 103. In some cases, for example, where step 707 is performed directly after step 705, the information may only include the tag identifier (e.g., tag ID). In other cases, even where step 707 is performed directly after step 705, the information may include a tag identifier and an indication that no reaction was detected. Still, in some cases, for example, where step 707 is performed in response to the completion of step 706, the information may include the tag identifier and an associated reaction or the evaluation information indicating the reaction. Further, in some cases, the evaluation information may be transmitted without the tag identifier. Transmission at step 707 may include generating a header including a network address (e.g., an IP address) and combining the header with the evaluation information and/or tag identifier.

At the local office 103 the information may be routed to a social network communication service 301 and/or a third party, such as a content provider or content creator. Where the information is transmitted to a social network communication service 301, the information may be shared with others, such as the user's friends and/or family. Also, where the information is transmitted to a third party, such as a content creator, the content creator may evaluate the information to determine whether the content is causing the intended/desired reactions. Such information may be valuable to some entities, such as advertisers. Content creators may also receive aggregated information based on a gender of users that consumed the content. In some examples, image recognition techniques may automatically classify users as male or female. Accordingly, the tags may be aggregated on the basis of gender for reactions provided to the content creator. Similarly, some embodiments may implement image recognition techniques that can determine a person's age, and thus, reaction information may be aggregated on the basis of age as well.

After step 707 is completed, the process may determine whether reaction information (including the absence of a reaction) to the detected tag has been obtained for each of the identified users at step 708. If reaction information for each identified user has not been detected (No at step 708), then the process may loop back to step 704 to detect a reaction of another identified user. While the process may return to step 704, it should be understood that in some cases the reaction of another user may be detected from the same information previously obtained in step 704. For example, if an image was captured in step 704, another image might not be captured when step 704 is repeated because the reaction information for each of the identified users might be obtained from the same image.

If reaction information for each identified user has been detected (Yes at step 708), then the process may proceed to step 709 in which the process may wait for a set period of time T before returning to step 701. In some embodiments, the step 709 may wait until a change in the content is detected before returning the process to step 701. Still, in other embodiments, step 709 may simply end the process. Step 709 may be performed in a similar manner as step 511 of FIG. 5.

There may be multiple tags in any one piece of content. That is, a streaming video program may include a plurality of tags at different points within the stream where reaction information is desirable. From the multiple reactions, a reaction model may be constructed to reflect the varying reactions of a user throughout a piece of content. Accordingly, in some embodiments, where a plurality of reactions throughout a piece of content is desirable, step 709 may return the process to step 703 thereby only identifying users once at step 701 so as not to collect reaction information for users who began consuming the content after it started streaming.

Figure 8:
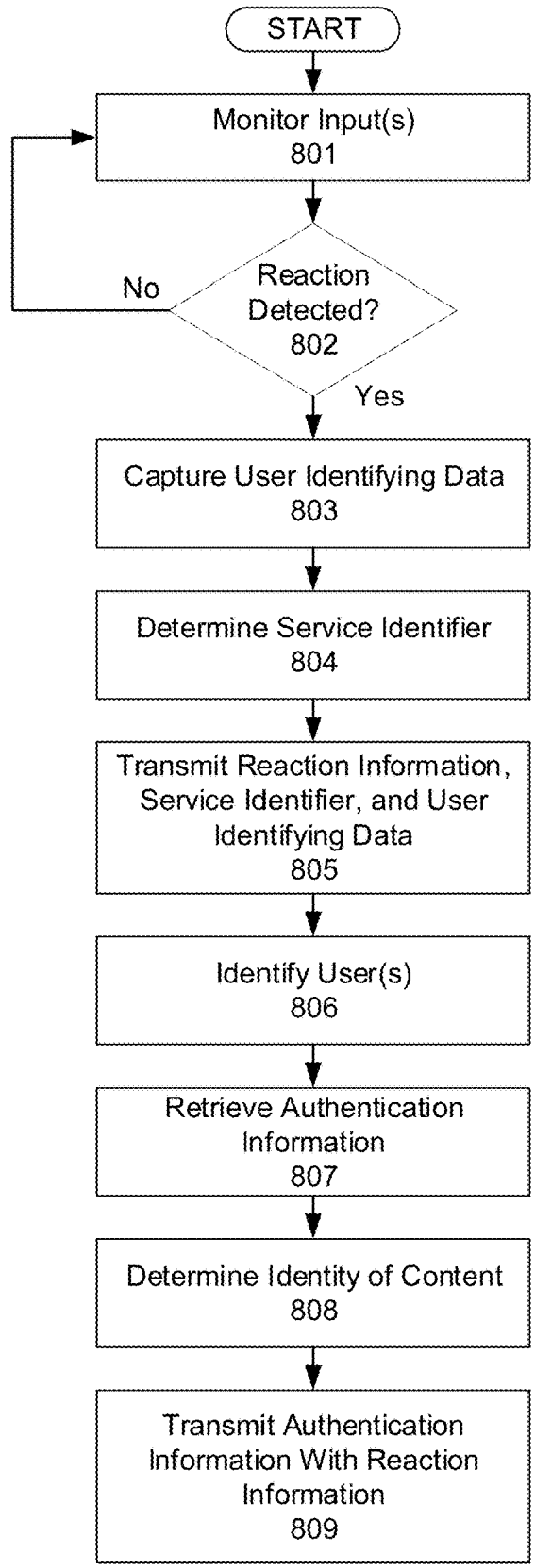
FIG. 8 is a flow diagram illustrating an example method according to one or more aspects of the disclosure.

In another aspect of the present disclosure, information from input devices, such as cameras 303, microphones 304, or other sensors, may be continuously monitored to detect reactions and subsequently identify users to whom those reactions belong to. FIG. 8 is a flow diagram illustrating another example method for carrying out this aspect. The method of FIG. 8 may authenticate a user to his/her own social network communication service 301 and allow the user to share content consumption information, such as a reaction to content the user is consuming, via the social network communication service 301.

In step 801, one or more inputs are monitored to detect a reaction of a user to content that he/she is currently consuming. For example, image data obtained through a video camera may be monitored to detect a reaction of a user, such as signaling a thumbs-up or thumbs-down sign, to a television program. Additionally, or alternatively, step 801 may monitor audio inputs to detect, for example, laughing, screaming, or a user's speech. For example, the system may monitor audio inputs received through a microphone 304 to detect whether a user has spoken certain words indicating a reaction, such as "I like this show" or "this movie is funny." In some embodiments, step 801 may monitor inputs made through a remote control device 302a, such as pressing a particular button or sequence of buttons. For example, the system may monitor inputs made on a television remote to detect when a user presses one or more designated buttons on the remote indicating how a user feels about the content he/she is consuming. Meanwhile, step 802 determines whether a reaction has been detected. If no reaction is detected (No at step 802), the system may continue to monitor inputs. In some embodiments, the system will monitor inputs as long as content is being streamed.

Once a reaction is detected (Yes at step 802), reaction information may be obtained, and the process may proceed to step 803 in which user identifying data is captured. Capturing user identifying data may include capturing an image of a user, capturing a voice of a user, capturing a fingerprint of a user, capturing a retinal scan of a user, etc. In some embodiments, the user identifying data may be the same input data from which the reaction is determined. For example, if an image is used for detecting a reaction, that same image may be used as the user identifying data from which the user's identity may be subsequently determined.

In one or more arrangements, step 803 may require capturing user identifying data in addition to the data inputted for monitoring in step 801. For example, if a user indicates a reaction by pressing a button on a remote control device 302a, the user may then take a picture of himself/ herself using the remote control device 302a at step 803. The image data from such a picture may later be used to identify the user. Also, although step 803 is shown as occurring after steps 801 and 802, it should be realized that step 803 may be performed before step 801.

In step 804, the service identifier is determined. The service identifier may be detected by any user device, such as the remote control device 302a, media hub 302, display device 112, etc. In some embodiments, the detected service identifier may be associated with a timestamp indicating a time at which the service identifier was detected. Further, the service identifier may also be associated with a region code (e.g., zip code) representing the location of premises 102 at which the user is consuming content. This region code may be retrieved from any user device, such as the remote control device 302a, media hub 302, or display device 112, located at the premises 102.

In step 805, the reaction information (e.g., image data, audio data, fingerprint data, etc. used to capture the reaction), service identifier and its associated information, and/or the user identifying data may be transmitted to a backend server (e.g., the social network information managing platform 306 of the local office 103). By transferring the reaction information, service identifier and its associated information, and user identifying data upstream to the backend server, user devices (e.g., media hub 302, display devices 112, laptops, smartphones, etc.) can be relieved from having to execute some of the processing. By distributing some of the processing to the backend server, the overall efficiency of the system may be improved. Additional benefits of performing processing on the backend server may include enhanced security, reduced power consumption of user devices, increased processing speeds, and lower costs.

At step 806, the backend server (e.g., the social network information managing platform 306 of the local office 103) processes the user identifying data and/or reaction information to identify one or more users. Step 806 may be implemented using software for performing facial recognition, voice recognition, fingerprint recognition, etc. This software may utilize a database (e.g., the database 307 of the local office 103) or generate results that may be compared with data in the database. In either case, step 806 may determine the identity of one or more users.

For each user identified in step 806, authentication information for authenticating the respective user to a social network communication service 301 may be retrieved at step 807. Step 807 may be implemented using a database that stores user identities, which may be represented by names or alphanumeric reference characters, in association with authentication information for particular social network communication services 301 that the user belongs to. In one or more arrangements, such a database may be combined with the database used to identify a user so that when a user is identified the corresponding authentication information can be retrieved. In some cases, where a user belongs to multiple social network communication services 301, step 807 may retrieve the authentication information for each of the multiple social network communication services 301.

In step 808, the backend server may determine the identity of the content. For example, the backend server may determine the name of the television program or other information identifying the content consumed by the user. The backend server may use the service identifier, region code, and/or timestamp received from the premises 102 and a content distribution schedule stored at the backend server or a device in communication with the backend server.

Then, at step 809, the authentication information, content identity information, and reaction information may be transmitted from the backend server to one or more social network communication services 301. In one or more arrangements, the reaction information may be translated into evaluation information before being transmitted. For example, where the reaction information is an image of the user holding up ten fingers, the reaction information may be translated into evaluation information, which may be a message stating "I give it a ten."

Further, in some embodiments, at step 809, the authentication information may be sent first, and the content identity information and reaction information may be sent subsequently. Depending on the protocol used, the backend server may wait until it receives confirmation that the authentication information was received and approved by the social network communication service 301, before sending the content identity information and reaction information. Upon receipt of the content identity information and/or reaction information, the social network communication service 301 may then post the content identity information and/or reaction information on a webpage of the social network communication service 301 associated with the user who has been authenticated.

Although example embodiments are described above, the various features and steps may be combined, divided, omitted, rearranged, and/or augmented in any desired manner, depending on the specific secure process desired. For example, FIG. 8 may be modified to include features of FIG. 6 to prevent sharing a user's reaction to content while the user is channel surfing. Further, it should be understood that each of the steps in each of the processes described herein may be performed when one or more processors in one or more computing devices 200 execute computer-executable instructions. This patent should not be limited to the example embodiments described, but rather should have its scope determined by the claims that follow.

The invention claimed is:

1. A non-transitory computer-readable medium storing instructions that, when executed, cause:
   detecting, by a computing device, a tag within content;
   capturing, based on the detecting the tag and by a camera, an image of a reaction of a user consuming the content;
   determining that the user is willing to share the reaction with a social network;
   retrieving, based on an identity of the user, authentication information for the social network;
   comparing the reaction of the user to a plurality of predefined expressions, and finding at least one matching expression; and
   sending, to a server of the social network:
      the authentication information; and
      instructions for posting, to the social network, a message indicating an identity of the content and the at least one matching expression.

2. The non-transitory computer-readable medium of claim 1, wherein the plurality of predefined expressions is a subset of one or more types of reactions that the user is willing to share with the social network, and wherein the one or more types of reactions comprise one or more of crying, laughing, smiling, nodding, head shaking, yawning, or screaming.

3. The non-transitory computer-readable medium of claim 1, wherein the instructions in the computer-readable medium, when executed, further cause:
   evaluating the reaction of the user to determine physical characteristics of the user; and
   comparing the physical characteristics of the user to known data to identify the user consuming the content.

4. The non-transitory computer-readable medium of claim 1, wherein the instructions in the computer-readable medium, when executed, further cause:
   receiving information indicating one or more types of reactions that the user is not willing to share with the social network.

5. The non-transitory computer-readable medium of claim 1, wherein the reaction comprises one or more of a facial expression or a physical action.

6. The non-transitory computer-readable medium of claim 1, wherein the instructions in the computer-readable medium, when executed, further cause:
   receiving, before the user begins consuming the content, information indicating selection of one or more types of reactions that the user is willing to share with the social network.

7. The non-transitory computer-readable medium of claim 1, wherein the plurality of predefined expressions is a subset of one or more types of reactions that the user is willing to share with the social network.

8. The non-transitory computer-readable medium of claim 1, wherein the tag indicates a set of reaction types to be detected while outputting the content.

9. The non-transitory computer-readable medium of claim 1, wherein the comparing comprises comparing, based on a determination that the user is willing to share the reaction with the social network, the reaction of the user to the plurality of predefined expressions.

10. The non-transitory computer-readable medium of claim 1, wherein the instructions in the computer-readable medium, when executed, further cause:
    inserting the tag into the content at a point that is a predetermined amount of time prior to when the reaction of the user is expected.

11. The non-transitory computer-readable medium of claim 1, wherein the tag comprises a data packet inserted into the content.

12. A system comprising:
    a first computing device; and
    a second computing device,
    wherein the first computing device comprises:
       one or more first processors; and
       first memory storing first instructions that, when executed by the one or more first processors, cause the first computing device to:
       detect a tag within content;
       capture, based on the detecting the tag and via a camera, an image of a reaction of a user consuming the content;
       determine that the user is willing to share the reaction with a social network;
       retrieve, based on an identity of the user, authentication information for the social network;
       compare the reaction of the user to a plurality of predefined expressions, and find at least one matching expression; and
       send, to the second computing device:
          the authentication information; and
          instructions for posting, to the social network, a message indicating an identity of the content and the at least one matching expression,
    wherein the second computing device comprises:
       one or more second processors; and
       second memory storing second instructions that, when executed by the one or more second processors, cause the second computing device to:
       receive the authentication information.

13. The system of claim 12, wherein the plurality of predefined expressions is a subset of one or more types of reactions that the user is willing to share with the social network, and wherein the one or more types of reactions comprise one or more of crying, laughing, smiling, nodding, head shaking, yawning, or screaming.

14. The system of claim 12, wherein the first instructions, when executed by the one or more first processors, cause the first computing device to:
    evaluate the reaction of the user to determine physical characteristics of the user; and
    compare the physical characteristics of the user to known data to identify the user consuming the content.

15. The system of claim 12, wherein the first instructions, when executed by the one or more first processors, cause the first computing device to:
    receive information indicating one or more types of reactions that the user is not willing to share with the social network.

16. The system of claim 12, wherein the reaction comprises one or more of a facial expression or a physical action.

17. The system of claim 12, wherein the first instructions, when executed by the one or more first processors, cause the first computing device to:
    receive, before the user begins consuming the content, information indicating selection of one or more types of reactions that the user is willing to share with the social network.

18. The system of claim 12, wherein the plurality of predefined expressions is a subset of one or more types of reactions that the user is willing to share with the social network.

19. The system of claim 12, wherein the tag indicates a set of reaction types to be detected while outputting the content.

20. The system of claim 12, wherein the comparing comprises comparing, based on a determination that the user is willing to share the reaction with the social network, the reaction of the user to the plurality of predefined expressions.

21. The system of claim 12, wherein the first instructions, when executed by the one or more first processors, cause the first computing device to:
insert the tag into the content at a point that is a predetermined amount of time prior to when the reaction of the user is expected.

22. The system of claim 12, wherein the tag comprises a data packet inserted into the content.

23. A non-transitory computer-readable medium storing instructions that, when executed, cause:
capturing, based on detecting a tag within content and via a camera, a reaction of a user consuming the content, wherein the tag indicates a subset of reaction types to be reported to a server of a social network;
determining whether the subset of reaction types indicated by the tag comprises the reaction of the user; and
sending, to the server of a social network and based on determining that the subset of reaction types indicated by the tag comprises the reaction of the user, the reaction.

24. The non-transitory computer-readable medium of claim 23, wherein the subset of reaction types indicated by the tag comprises a reaction of laughter, and wherein the instructions, when executed, further cause comparing a captured image of the user to an image that indicates the reaction of laughter.

25. The non-transitory computer-readable medium of claim 23, wherein the tag triggers capturing, during output of the content, of an image of a face of the user.

26. The non-transitory computer-readable medium of claim 23, wherein the determining comprises:
comparing the reaction of the user to a plurality of predefined expressions, and determining at least a matching expression.

27. The non-transitory computer-readable medium of claim 23, wherein the tag is determined based on a genre of the content.

28. The non-transitory computer-readable medium of claim 23, wherein the tag indicates a gender of user from which to collect reactions while outputting the content.

29. A system comprising:
a first computing device; and
a second computing device of a social network,
wherein the first computing device comprises:
one or more first processors; and
first memory storing first instructions that, when executed by the one or more first processors, cause the first computing device to:
capture, based on detecting a tag within content and via a camera, a reaction of a user consuming the content, wherein the tag indicates a subset of reaction types to be reported to the second computing device of the social network;
determine whether the subset of reaction types indicated by the tag comprises the reaction of the user; and
send, to the second computing device of the social network and based on determining that the subset of reaction types indicated by the tag comprises the reaction of the user, the reaction,
wherein the second computing device comprises:
one or more second processors; and
second memory storing second instructions that, when executed by the one or more second processors, cause the second computing device to:
receive the reaction.

30. The system of claim 29, wherein the subset of reaction types indicated by the tag comprises a reaction of laughter, and wherein the first instructions, when executed by the one or more first processors, further cause the first computing device to compare a captured image of the user to an image that indicates the reaction of laughter.

31. The system of claim 29, wherein the tag triggers capturing, during output of the content, of an image of a face of the user.

32. The system of claim 29, wherein the determining comprises:
comparing the reaction of the user to a plurality of predefined expressions, and determining at least a matching expression.

33. The system of claim 29, wherein the tag is determined based on a genre of the content.

34. The system of claim 29, wherein the tag indicates a gender of user from which to collect reactions while outputting the content.

\* \* \* \* \*

UNITED STATES PATENT AND TRADEMARK OFFICE
CERTIFICATE OF CORRECTION

| | | |
|---|---|---|
| PATENT NO. | : 11,900,484 B2 | Page 1 of 1 |
| APPLICATION NO. | : 17/992485 | |
| DATED | : February 13, 2024 | |
| INVENTOR(S) | : Srinivasan et al. | |

It is certified that error appears in the above-identified patent and that said Letters Patent is hereby corrected as shown below:

In the Specification

Column 4, Line 39:
Delete "x i-fi" and insert --wi-fi--

Column 19, Line 23:
After "streaming", insert --.--

Signed and Sealed this
Fourth Day of March, 2025

Coke Morgan Stewart
*Acting Director of the United States Patent and Trademark Office*